Jan. 2, 1934.  W. L. GRATHWOL  1,942,358
VACUUM CLEANER ATTACHMENT FOR AUTOMOBILES
Filed Dec. 1, 1931   2 Sheets-Sheet 1
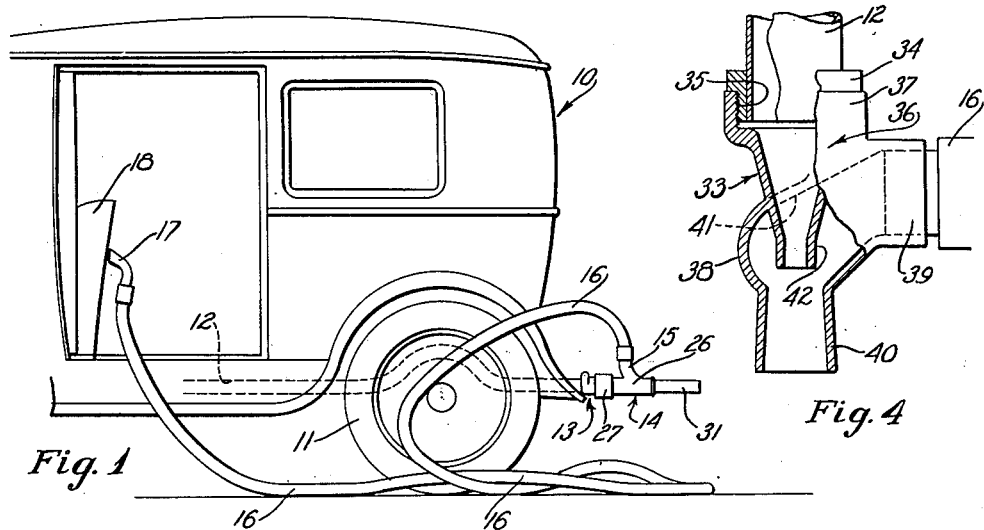
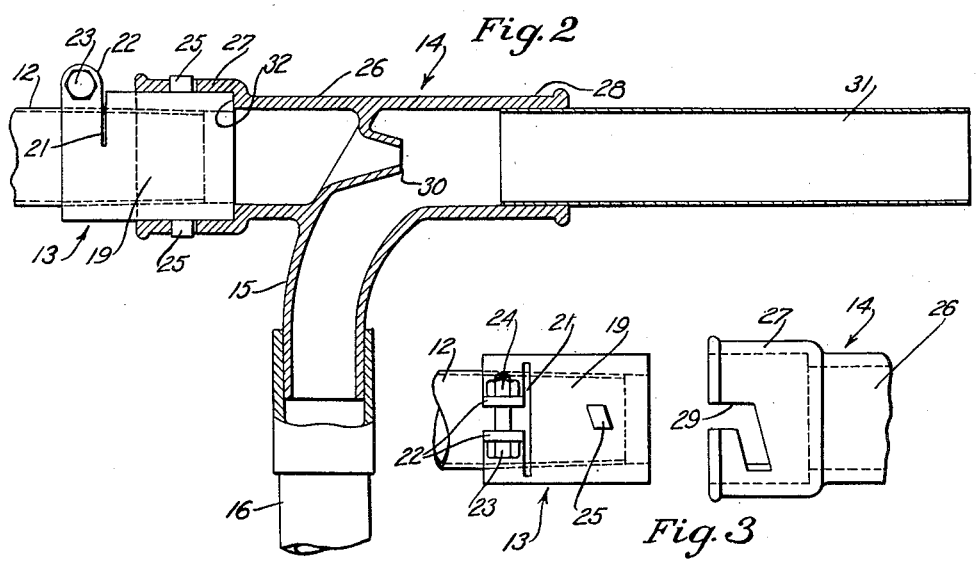
INVENTOR.
WILLIAM L. GRATHWOL
BY John J. Hanrahan
ATTORNEY Jan. 2, 1934.  W. L. GRATHWOL  1,942,358
VACUUM CLEANER ATTACHMENT FOR AUTOMOBILES
Filed Dec. 1, 1931   2 Sheets-Sheet 2
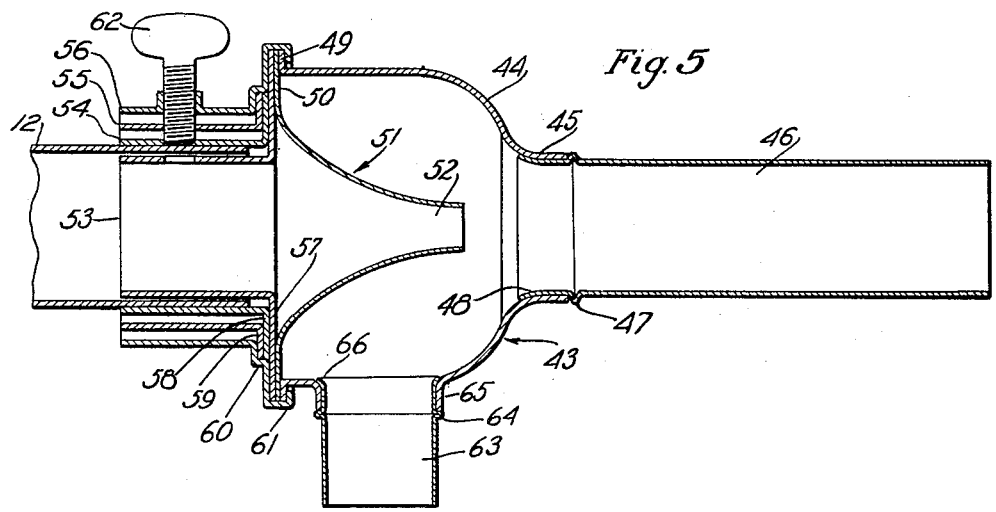
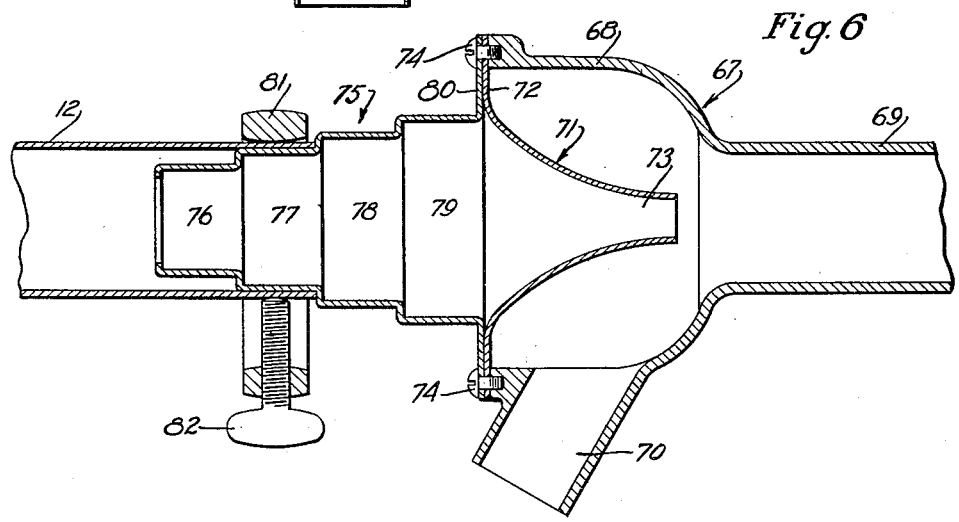
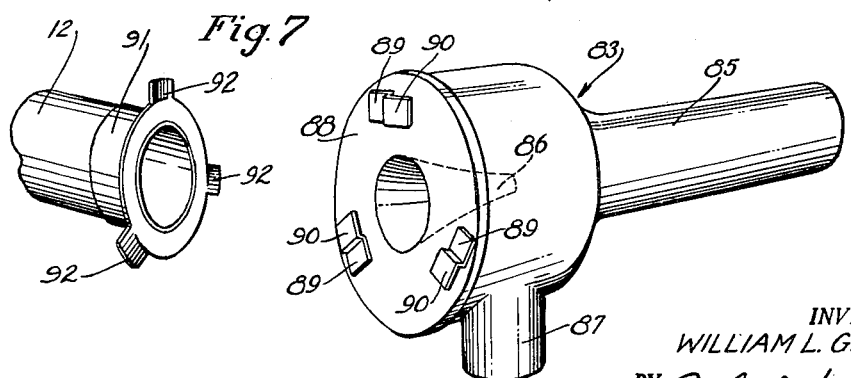
INVENTOR.
WILLIAM L. GRATHWOL
BY John H. Hanrahan
ATTORNEY Patented Jan. 2, 1934

1,942,358

UNITED STATES PATENT OFFICE 1,942,358

VACUUM CLEANER ATTACHMENT FOR AUTOMOBILES

William L. Grathwol, Stratford, Conn., assignor to The Pootatuck Corporation, Stratford, Conn., a corporation of Connecticut Application December 1, 1931. Serial No. 578,269

11 Claims. (Cl. 230—95)

This invention relates to vacuum cleaning attachments for automobiles and has particular relation to a vacuum cleaning means adapted to be connected with the end portion of the exhaust pipe of an automobile and which is so constructed that the exhaust gas passing therethrough will set up a vacuum or suction in a suitable flexible hose or the like having a suction nozzle thereon.

An object of the invention is to provide a vacuum cleaning attachment as stated and which may be easily and quickly applied to and removed from the end portion of an automobile exhaust pipe whereby the device may be readily attached for use and after use may be readily removed for storage or the like.

A further object is to provide a vacuum creating unit or attachment as stated and which includes an adaptor permanently secured to the end portion of the exhaust pipe of an automobile, a body, and the body and adaptor including complemental means whereby the body may be readily applied to and removed from the exhaust pipe.

An additional object is to provide a device of the character indicated and including means readily adapting it for attachment to exhaust pipes of various sizes.

Other objects and advantages will become apparent from a consideration of the following detailed description taken in connection with the accompanying drawings wherein satisfactory embodiments of the invention are shown. It will, of course, be understood that the invention is not limited to the details disclosed but includes all such variations and modifications as fall within the spirit of the invention and the scope of the appended claims.

In the drawings:

Figure 1 is a side elevational view showing the rear portion of an automobile the invention being shown as coupled with the exhaust pipe of the automobile and in use;

Fig. 2 is a longitudinal sectional view through the attachment or vacuum creating unit of Fig. 1;

Fig. 3 is a plan view showing the complemental means for connecting the body of the unit with the adaptor;

Fig. 4 is a view partly in section and partly in elevation and showing a slightly modified construction;

Fig. 5 is a central longitudinal sectional view through a further modified construction;

Fig. 6 is a similar view showing yet another modification;

Fig. 7 is a perspective view showing a further modification of a coupling means between the body of the unit and the adaptor;

The present disclosure is in part the same as that of my prior Patent No. 1,738,066 of December 3rd, 1929, the modification shown in Fig. 6 of that patent, and not specifically claimed therein, being disclosed in the present application as Fig. 4.

Referring in detail to the drawings, at 10 is shown the rear portion of the body of an automobile having ground engaging wheels 11 and an exhaust pipe 12 extending rearwardly from the internal combustion engine (not shown) and having its rear or discharge end disposed adjacent the rear of the body 10. In the form shown in Fig. 1 the vacuum creating unit includes an adaptor 13 permanently mounted on the end portion of the exhaust pipe and having a body 14 coupled therewith, the said body including a laterally disposed suction inlet 15 to which is connected a flexible hose or conduit 16 having a suction nozzle 17 at its free end, the said nozzle being shown as being used in the cleaning of the back 18 of an automobile seat.

Referring more particularly to Figs. 2 and 3 the adaptor 13 as here disclosed includes a short tubular section 19 internally tapered and circumferentially slotted as at 21 and in the rear of the slot 21 provided with ears or lugs 22 connected as by a bolt 23 having a nut 24 threaded thereon. Obviously, the tightening of the nut 24 will serve to draw the ears 22 toward one another whereby to close or reduce the larger end of the section to cause it to tightly clamp the free end of the exhaust pipe 12. The adaptor is shown as provided at diametrically opposite points with radially extending lugs 25 and as the description proceeds it will become evident that while two of these lugs are shown one lug alone might be used or if desired a number greater than shown might be used.

The body 14 includes a substantially cylindrical elongated outer portion 26 open at its opposite ends to provide an entrance portion 27 and an exit or discharge portion 28. Entrance portion 27 is somewhat enlarged as clearly shown and is of an internal diameter to more or less snugly receive the section 19 of the adaptor 13. The inner diameter of the cylindrical portion 26 of the body 14 is substantially the same as that of the adaptor or of the exhaust pipe. In its entrance portion 27 the body 14 is provided with a bayonet slot 29 to receive a lug 25 on the adaptor whereby the body may be secured in position on the free end of the exhaust pipe. Of course, if the adaptor is provided with a pair of the lugs 25 then a pair of bayonet slots 29 must be provided.

Arranged within the body 14 is a nozzle or venturi 30 shown as formed integral with the body and having its large or entrance portion disposed to receive exhaust gases discharged into the body from the exhaust pipe 12. The discharge end of the nozzle 30 is arranged substantially in line with the discharge portion 28 of the body and the purpose of this nozzle is, of course, to increase the velocity of the exhaust gas passing through the body. As is very clearly shown in Fig. 2 the nozzle 30 discharges at a point within the lateral opening through the portion 26 and which opening communicates with the suction inlet nipple 15 whereby the nozzle discharges into a zone of greater cross section than that of the exhaust pipe.

A tube 31 is fitted into the discharge end or exit end of the body 14 and it has been ascertained that owing to the presence of this tube a more efficient device is provided in that a greater suction is obtained. This is probably due to the fact that the cross sectional area of the gas should be limited for an appreciable distance beyond the point where the suction inlet 15 communicates with the interior of the body.

Also, in applying and removing the attachment the tube 31 may be used as a handle and thereby make it easier to apply the device to an automobile in which the exhaust pipe stops or terminates some little distance inwardly of the rear of the car. It will be appreciated that the body is applied to the adaptor 13 by inserting the portion 27 of the body over the adaptor and then giving the body a partial turn whereby the lugs 25 will be disposed in the inner ends of the bayonet slots 29. It is to be noted that the inner portions of the slots 29 are slightly inclined whereby the body will be drawn onto the coupler during this slight rotary movement whereby to draw the annular shoulder 32 of the body against the end of the adaptor. From Fig. 3 it will be apparent that lugs 25 are set at an angle to cooperate with the slots and assist this drawing action.

Fig. 4 discloses a slightly modified structure, the disclosure of this figure being identical with that of Fig. 6 of my Patent No. 1,738,066 of December 3rd, 1929, above referred to. In this figure a suction creating unit generally indicated by the reference character 33 is shown as removably secured to the end of the exhaust pipe 12 in a manner whereby the unit may be readily applied for use and removed after use. Therefore, as in the case of that form of the device shown in Figs. 1, 2 and 3, during the normal use of an automobile the vacuum cleaning unit 33 and the necessary hose and the like is not attached to the exhaust pipe and will not become lost or cause annoyance as by rattling but may be stowed under the car seat or left at home.

To provide for the ready application and removal of the unit 33 to and from the end of the exhaust pipe 12, a coupling or adaptor 34 is preferably permanently secured to the outside of the exhaust pipe at the end thereof. This adaptor 34 may be permanently secured to the exhaust pipe as by clamping or by being slightly tapered and driven on, or otherwise as desired or found most convenient or expedient. Since the adaptor is secured to the outside of the exhaust pipe it will, of course, be appreciated that it may be left in place when not in use and will not cut down the capacity of the exhaust pipe in a manner to create a back pressure or cause other inconvenience.

As herein disclosed the coupling or adaptor 34 includes a reduced threaded portion 35 and the suction creating unit 33 comprises a connecting and exhaust gas entrance or inlet portion 36 including an enlarged and internally screw threaded portion 37 threadable on the reduced portion 35 of the adaptor whereby to secure the unit to the exhaust pipe in a manner to have exhaust gases discharged from the pipe into the unit. Preferably, the parts are so arranged that the free end of the part 37 will abut the shoulder formed at the end of the reduced portion 35 of the coupling or adaptor when the parts are fully connected whereby a tight joint is insured. As the description proceeds it will become apparent that the unit 33 may be mounted other than by a screw threaded connection as shown.

In addition to the inlet portion 36 the unit 33 comprises a body 38 having a suction inlet 39 and an outlet or discharge portion 40. The connecting or exhaust gas inlet portion 36 is shown as cast with the body 38 and it is tapered and extends through the wall 41 of the body to the interior thereof providing a gas accelerator or nozzle or venturi 42. Of course, the nozzle or venturi of this figure performs as in the structure of the previously described figures. That is, it reduces the cross sectional area of the exhaust gas passage and therefore increases or accelerates the flow.

The free end of the tapered or cone shaped portion or nozzle 42 is in line with the discharge portion 40 of the body 38 whereby exhaust gas from this nozzle or venturi is discharged in line with the discharge or outlet opening through the portion 40. Suction inlet 39 is adapted to be connected with the hose 16 as described in connection with Figs. 1, 2 and 3 and, of course, a suction nozzle will be applied to the free end of the hose.

Obviously, the suction inlet 39 is arranged laterally of the venturi or accelerator 42 and is substantially at right angles to the discharge or outlet 40. Exhaust gases from the automobile engine will set up a suction or vacuum in the body 38 and this vacuum will be satisfied through the hose 16 connected with the suction inlet and dirt and dust drawn through the hose will be discharged or blown out through the outlet 40.

As pointed out above the unit 33 is adapted to be applied for use and removed after use, the coupler or adaptor 34 being permanently attached to the end portion of the exhaust pipe. Since the unit is shown as applied by rotary movement the discharge end or portion 40 being rigid with the remainder of the unit may be employed as a handle in the operation of applying and removing the unit. That is, the operator may grasp the portion 40 and the same will provide a handle or extension to assist in reaching the end of the exhaust pipe particularly if the end of the exhaust pipe does not extend beyond the back of the car.

In Fig. 5, the device is shown as constructed of sheet metal and here the unit generally indicated by the reference character 43 comprises a bulbous shaped body 44 of a diameter considerably greater than the diameter of the exhaust pipe 12 and having a reduced neck or discharge portion 45 of a diameter substantially less than that of the body. A tube 46 corresponding with the tube 31 of Figs. 1 and 2 has an end portion disposed in the neck 45, the said end portion including a bead 47 engaging the outer edge of the neck portion and the said end being turned or flared as at 48 whereby the tube is secured to the body.

The opposite end of the body 44 constitutes the entrance end and at this end is provided an outwardly turned annular flange 49 against which may be disposed the annular flange portion 50 of a nozzle or venturi 51 also preferably formed of sheet metal. This venturi or nozzle 51 has its discharge end 52 arranged to discharge in the direction of the inner end of the tube 46.

Means are provided at the entrance end of the body 44 whereby the unit may be easily and quickly applied to and removed from the end of an exhaust pipe and this means is so constructed as to adapt it for the mounting of the unit on the end portions of exhaust pipes of various diameters. Said means includes a plurality of concentrically arranged short sleeves or tubes of varying diameters. The difference in the diameters of the various tubes is such that the tubes are slightly spaced from one another and in the drawings the innermost tube, or the tube having the smallest diameter is shown at 53 while the other tubes numbered 54, 55 and 56 are of increased diameter in the order named.

The respective tubes at their inner ends are each provided with an annular flange and the flanges are designated 57, 58, 59 and 60 respectively. As shown, flange 57 bears against or is disposed against the flange 50 of the nozzle 51 and is of a diameter substantially equal to or the same as that of the flange 50. Flange 58 is disposed against the flange 57 and is of lesser diameter and the flange 59 is in turn disposed against the flange 58. The flange 60 is disposed over the other flanges and has its edge portion 61 bent or crimped about the flange 57 of the sleeve 53, the flange 50 of the nozzle 51 and the flange 49 of the body 44 whereby all of the parts are clamped or secured together.

Sleeves 53 through 56 are provided with aligned openings through which may be threaded a thumb screw 62 whereby to secure the device to the end of an exhaust pipe. In the use of the device the end of the exhaust pipe 12 will be disposed within one of the sleeves 53 to 56 depending on the diameter of the pipe. As disclosed the pipe 12 fits snugly within the sleeve 54 and the screw 12 has been threaded down through the aligned openings in the sleeves until the screw clamps against the side of the end portion of the exhaust pipe. The device is then secured in place on the exhaust pipe and the hose 16 may be connected with the suction inlet 63. Preferably the sleeves 53 through 56 are tapered in order that they will snugly engage the end portions of pipes to which the device may be affixed.

Suction inlet 63 comprises a short tube preferably of sheet metal and having a bead 64 abutting the edge of an out-turned nipple or neck 65 formed with the body and at its inner end the tube is spread or flared as at 66 whereby it will be securely held in place. It is clear from Fig. 5 that the suction inlet is arranged laterally of the exhaust entrance and exit of the housing 44 and laterally of the nozzle or venturi 51 and it will be obvious that the device of Fig. 5 functions in the manner already described in connection with the figures previously considered.

Fig. 6 shows a further modified construction and here the unit generally indicated by the reference character 67 is shown as comprising a cast body 68 having a tube 69 integral therewith and having a suction inlet 70 also integral therewith. Obviously, the tube 69 corresponds with the tube 46 of the form of invention shown in Fig. 5 while the suction inlet nipple 70 of Fig. 6 corresponds with the short tube or inlet sleeve 63 of Fig. 5.

A nozzle or venturi 71 is arranged within the body 68 and includes an annular flange 72 and a discharge portion 73 arranged in alignment with the tube 69. The flange 72 of the nozzle is disposed against the open entrance end of the body 68 and is secured to the body as by screws 74 passing through the flange and into the end portion of the body. These screws 74 also serve to secure to the body a mounting member 75 comprising a series of sections 76, 77, 78 and 79 of successively increasing diameter and an annular flange 80 carried by the innermost section and disposed against the flange 72 and through which the screws 74 pass.

This member 75 is shown as formed of sheet metal and it will be noted that it does not taper from one end to the other but that the different sections are stepped up from one diameter to the next whereby vertical shoulders or abutments are provided at the point where the member goes from one section to the next. The sections themselves may be slightly tapered whereby they may be wedged into the end of an exhaust pipe and it will be noted that the sections being of different diameters adapt the member for the mounting of the unit on various diameters of exhaust pipes.

That is, the section 76 will adapt the member for the mounting of the unit on an exhaust pipe of relatively small diameter while the succeeding sections adapt the member for the mounting of the unit on exhaust pipes of greater diameters. In applying the device to an exhaust pipe the member 75 is inserted in the pipe until one of the sections seats against the inner surface of the pipe or until the pipe abuts one of the vertical shoulders or walls at a point where one section ends and another begins. This, as a rule, will give a fairly tight fit since the sections are preferably individually tapered.

A clamp 81 is disposed about the exhaust pipe and this clamp is in the form of a ring having a thumb screw 82 threaded therethrough and when the device is being applied this thumb screw is tightened until the end portion of the exhaust pipe is drawn into engagement with the largest section of the member 75 within the exhaust pipe. The unit is thus secured in place and with the hose 16 coupled with the inlet nipple 70 the device will be ready for use. To remove the unit or device it is, of course, but necessary to loosen the screw 82 and the clamping ring 81 and screw 82 may be removed with the remainder of the unit.

Fig. 7 shows yet a further modification and here the unit generally designated 83 is shown as including a body 84, a discharge tube 85, a nozzle or venturi 86 and a suction inlet nipple 87. A head 88 partially closes the entrance end of the body 84 and may carry the venturi or nozzle 86 and on its outer surface carries spaced brackets 89 each including a portion 90 spaced from the surface of the head. To co-operate with these brackets in the securing of the unit to the end of an exhaust pipe 12 an adaptor 91 is secured, permanently or otherwise, to the end portion of the exhaust pipe and this adaptor includes radially extending lugs or projections 92 adapted to co-operate with the brackets 89.

It will be appreciated that the unit of Fig. 7 is applied to the exhaust pipe by disposing the unit against the outer face of the adaptor 91 with the lugs or projections 92 disposed in line with the portions 90 of the brackets 89. A slight turning movement of the unit will result in the portions 90 of the brackets 89 being carried over the lugs 92 whereby the unit will be secured in place. The removal of the unit will, of course, be accomplished by a reverse operation. If desired, the tube 85 may be used as a handle as in the case of the tubes 69 and 46 of Figs. 6 and 5. Preferably, the lugs 92 are wedge shaped whereby the head 88 will be drawn into engagement with the face of the coupling or adaptor 91.

Having thus described the invention, what is claimed is:

1. In an automotive vehicle, a pipe providing a passage for exhaust gas, a ring-like adaptor telescoping with and permanently secured to the pipe at the free end thereof, said adaptor disposed on the outside of said pipe so as not to interfere with the passage of gas therethrough, a vacuum creating unit, said unit including a portion to telescopingly receive said adaptor so as not to interfere with the passage of exhaust gas through the exhaust pipe and complemental means on the adaptor and unit whereby the unit may be readily attached to and detached from the end of the exhaust pipe.

2. In a device of the character described, a ring-like adaptor telescoping with and permanently secured to the free end portion of an automobile exhaust pipe, a vacuum creating unit, complemental means on the adaptor and unit whereby the unit may be readily attached to and detached from the end of the exhaust pipe, said unit comprising a body having an open end to receive the adaptor, a tapered portion to receive gas from the exhaust pipe, an inlet laterally of the tapered portion, and an outlet in line with the discharge end of the tapered portion and in communication with the inlet.

3. A vacuum creating attachment for automobiles, said attachment comprising a ring-like adaptor to telescope with the exhaust pipe, said adaptor including means to clamp it on the free end portion of an automobile exhaust pipe, a suction creating unit, said unit including a portion to telescopingly receive said adaptor so as not to interfere with the passage of gas through the exhaust pipe, complemental means between the unit and adaptor whereby the unit may be removably secured to the end portion of the exhaust pipe in position to receive the exhaust gas therefrom, said complemental means including a lug on the adaptor and a bayonet slot opening through one end of the unit.

4. A vacuum creating attachment for automobiles, said attachment comprising a ring-like internally tapered adaptor to telescope over the free end portion of an exhaust pipe, said adaptor including means to clamp it on the free end portion of the automobile exhaust pipe, a suction creating unit, said unit including a portion to telescopingly receive said adaptor so as not to interfere with the passage of exhaust gas through the exhaust pipe, complemental means between the body and adaptor whereby the body may be removably secured to the free end portion of the exhaust pipe in position to receive exhaust gas therefrom, said complemental means including a lug on the adaptor and a bayonet slot opening through one end of the unit.

5. A vacuum creating unit for attachment to the free end portion of the exhaust pipe of an automobile to receive the exhaust gas therefrom, said unit comprising a body having a bulbous shaped portion and a discharge tube extending from an end thereof, said body having an entrance opening through its other end, a series of concentric members arranged one within the other at said other end of the body and about the entrance opening therein, said members adapted to receive the free end portion of an exhaust pipe to mount the body on the exhaust pipe, means passing radially through said members to secure them to the exhaust pipe, said members spaced apart whereby they are adapted to receive exhaust pipes of different sizes, and said body having a suction inlet laterally of the entrance opening.

6. A vacuum creating unit for attachment to the free end portion of the exhaust pipe of an automobile to receive the exhaust gas therefrom, said unit comprising a body having a bulbous shaped portion and a discharge tube extending from one end thereof, said body having an entrance opening through its other end, a series of concentric members arranged one within the other at said other end of the body and about the entrance opening therein, said members adapted to receive the free end portion of an exhaust pipe to mount the body on the exhaust pipe, means passing radially through said members to engage and secure them to the exhaust pipe, said members spaced apart whereby they are adapted to receive exhaust pipes of different diameters, a nozzle within the body in position to receive exhaust gas entering the body, said nozzle having its discharge end arranged in the direction of the discharge tube, and said body having a suction inlet laterally of the nozzle.

7. A vacuum creating unit for attachment to the free end portion of the exhaust pipe of an automobile to receive the exhaust gas therefrom, said unit comprising a sheet metal body having a sheet metal discharge tube extending from an end thereof, said body having an entrance opening through its other end, a series of concentric sheet metal sleeves at said other end of the body and about the entrance opening therein, said sleeves each including an annular flange, a sheet metal nozzle within the body, said nozzle including an annular flange abutting the annular flange of one of said sleeves, means clamping all of said flanges together and against and to one end of the body, said sleeves arranged one within the other and adapted to receive the end portion of an exhaust pipe to mount the body on the exhaust pipe, means passing through said sleeves to engage and secure them to the exhaust pipe, said sleeves spaced apart whereby they are adapted to receive exhaust pipes of different sizes, and said body having a suction inlet laterally of the entrance opening.

8. A vacuum creating unit for attachment to the free end portion of the exhaust pipe of an automobile in position to receive the exhaust gas therefrom, said unit comprising a sheet metal body having a sheet metal discharge tube extending from an end thereof, said body having an entrance opening, a series of nested concentric sheet metal sleeves about the entrance opening of the body, said sleeves each including an annular flange, a sheet metal nozzle within the body, said nozzle including an annular flange abutting the annular flange of one of said sleeves, said body having a flange about its entrance opening, the flange of the outermost of said sleeves bent about said other flanges and about the flange on the body whereby the sleeves, nozzle and body are secured together, said sleeves adapted to receive the free end portion of an exhaust pipe to mount the body on the exhaust pipe, means passing through said sleeves to engage and secure them to the exhaust pipe, said sleeves spaced apart whereby they are adapted to receive exhaust pipes of different sizes, and said body having a suction inlet laterally of the nozzle.

9. A vacuum creating unit for attachment to the free end portion of an exhaust pipe of an automobile to receive the exhaust gas therefrom, said unit comprising a body having entrance and discharge ends, said body having a suction inlet, a nozzle within the body to receive the exhaust gas, means on the entrance end of the body for mounting the body on the free end portion of an exhaust pipe, said means comprising a hollow open ended member including a plurality of sections of increasing diameter beginning with the outermost section, said sections smooth on their outer surfaces, said member adapted to be inserted into the free end of an exhaust pipe until the outer surface of one of said sections engages the inner surface of the end portion of the exhaust pipe, said member including an annular flange at its larger end, said nozzle including an annular flange at its larger ends, and means passing through said flanges and securing the member and nozzle to the body.

10. In a vacuum cleaning attachment for automobiles, an adaptor to be permanently secured to the free end portion of the automobile exhaust pipe, a body to be connected with said adaptor, complemental means between the body and adaptor whereby the body may be removably secured to the free end portion of the exhaust pipe in position to receive exhaust gas therefrom, said body including an entrance for the exhaust gas, an exit opposite the entrance, a nozzle within the body in position to have the exhaust gas pass therethrough, a suction inlet to the body, said suction inlet arranged laterally of said nozzle, and said complemental means including lugs on the adaptor and brackets on the body and adapted on a relative turning movement between the body and adaptor to removably secure the body to the discharge end of the exhaust pipe.

11. A vacuum creating unit for attachment to the free end portion of the exhaust pipe of an automobile to receive exhaust gas therefrom, said unit comprising a body having entrance and discharge ends, said body having a suction inlet, a nozzle within the body to receive the exhaust gas, means for mounting the body on the free end portion of an exhaust pipe, said means comprising a hollow open ended member including a plurality of sections of increasing exterior diameter beginning with the outer-most section, said member adapted by a longitudinal movement to be inserted into the free end of an exhaust pipe until the outer surface of one of said sections engages the inner surface of the end portion of the exhaust pipe, and said member adapted to support the unit body in position to receive exhaust gas discharged from the exhaust pipe.

WILLIAM L. GRATHWOL.